J. B. DRAHONOVSKY.
RESILIENT WHEEL.
APPLICATION FILED MAY 24, 1915.
1,172,234.
Patented Feb. 15, 1916.
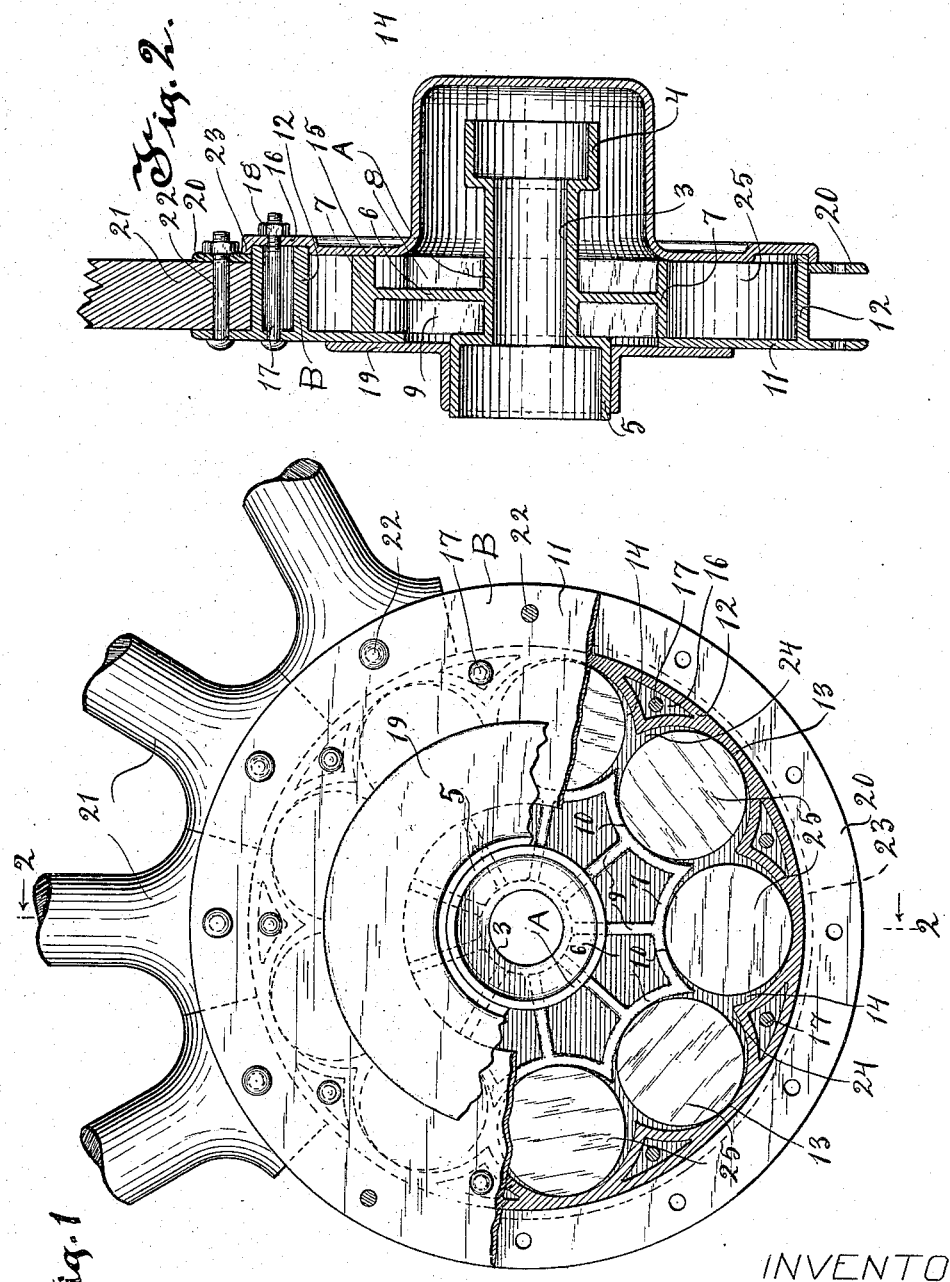
INVENTOR
John B. Drahonovsky
Morsell, Keeney & French
ATTORNEYS.

UNITED STATES PATENT OFFICE.

JOHN B. DRAHONOVSKY, OF MILWAUKEE, WISCONSIN, ASSIGNOR, BY DIRECT AND MESNE ASSIGNMENTS, TO J. B. D. HOLDING COMPANY, OF MILWAUKEE, WISCONSIN, A CORPORATION OF WISCONSIN.

RESILIENT WHEEL.

1,172,234.  Specification of Letters Patent.  Patented Feb. 15, 1916.

Application filed May 24, 1915. Serial No. 29,957.

*To all whom it may concern:*

Be it known that I, JOHN B. DRAHONOVSKY, a citizen of the United States, and resident of Milwaukee, in the county of Milwaukee and State of Wisconsin, have invented new and useful Improvements in Resilient Wheels, of which the following is a description, reference being had to the accompanying drawings, which are a part of this specification.

The invention relates to resilient wheels.

The invention designs more particularly to provide a new and improved form of resilient wheel of the type consisting of a movable outer hub member, an inner hub member concentrically arranged with respect thereto, and cushioning means between said members for resisting inward and outward movement of said members with respect to each other and thus forming a wheel which is especially adapted for use as the front wheel of a vehicle.

The invention further designs to provide a wheel of the type described in which the cushioning means consists of solid rubber blocks, preferably cylindrical, disposed in pockets formed by the inner and outer hub members.

The invention further designs to provide a new and improved form of resilient wheel.

The invention consists in the several features hereinafter set forth and more particularly defined by claim at the conclusion hereof.

In the drawings, Figure 1 is a view of the device embodying the invention, parts being broken away and parts being shown in section; Fig. 2 is a section taken on line 2—2 of Fig. 1.

The device comprises an inner hub member A, an outer hub member B concentrically arranged with respect to said inner member, and cushioning means interposed between said members to permit said members to move with respect to each other without shock.

The inner hub member A consists of an axial bore 3 for securing said member upon the axle of the vehicle, said bore having enlarged ends 4 and 5. A central web 6 extends outwardly from the hub portion 3 and carries a rim 7. The web 6 is further reinforced by webs 8 and 9 extending from the rim 7 and hub 3 on either side of the central web. The periphery of the rim 7 is divided into a plurality of concavities 10 for the purposes hereinafter described.

The outer wheel member B consists of an annular ring 11 having a transversely extending rim portion 12 whose inner periphery is provided with a plurality of concavities 13 for purposes hereinafter described. A hub cap member 14 incloses the outer end of the inner hub member and its annular portion 15 forms a guide for the flanges of the inner member and the outer portion 16 of said cap is secured to the transversely extending rim portion 12 of the member B by bolts 17 passing through the ring 11 and through the cap and secured in place by nuts 18. A hub plate 19 rigidly secured to the hub portion 5 serves as a guide for the ring 11. The ring 11 and the rim 12 together with an annular ring 20 form an annular receiving pocket for the spokes 21 which are secured therein by bolts 22 and the ring 20 is also held in position by an extension 23 on the cap member 14.

The concavities 10 on the rim 7 of the inner member A and the concavities 13 on the rim 12 of the outer member B are oppositely disposed with respect to each other to form a plurality of pockets 24 and cushioning means are disposed within each of said pockets. This means consists of a plurality of solid rubber blocks 25, preferably cylindrical, in cross section, which are positioned in the pockets 24 formed by the concavities 10 and 13 of the wheel member so that any movement of these members with respect to each other is cushioned by the yielding rubber interposed therebetween.

The invention thus exemplifies a resilient wheel comprising movable inner and outer hub members and a plurality of cushioning means interposed between said members.

What I claim as my invention is:—

In a resilient wheel, the combination of an inner hub member having a rim provided with a plurality of concavities on its outer periphery, an outer hub member concentrically disposed with respect to said member and comprising an annular ring and a rim extending transversely from said ring and having a plurality of concavities on its inner periphery, the concavities on said rims forming a plurality of radially disposed pockets, yielding blocks of material disposed in said pockets and adapted to be compressed between said hub members, a movable metallic hub cap carried by said outer hub member forming a guide for one side of the rim of the inner hub member, the ring of the outer hub member forming a guide for the other side of the rim of the inner hub member, and a plate secured to said inner hub member, forming a guide for the ring of the outer hub member.

In testimony whereof, I affix my signature.

JOHN B. DRAHONOVSKY.

Copies of this patent may be obtained for five cents each, by addressing the "Commissioner of Patents, Washington, D. C."